June 12, 1951 R. M. PAGE 2,556,211
PRECISION RANGE INDICATING SYSTEM
Filed March 11, 1943
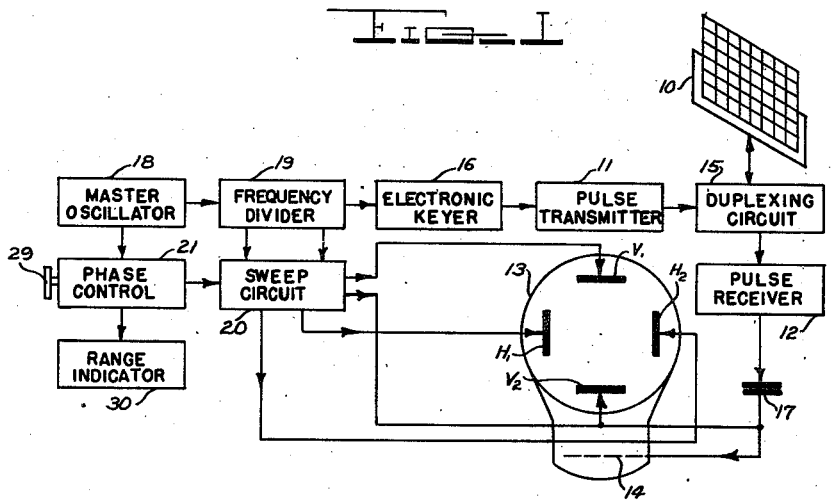
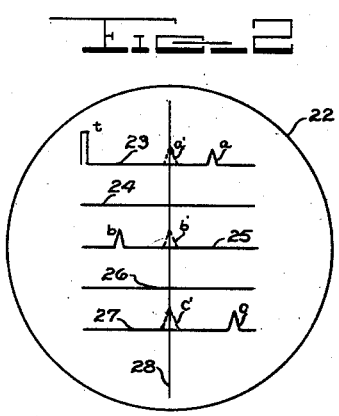
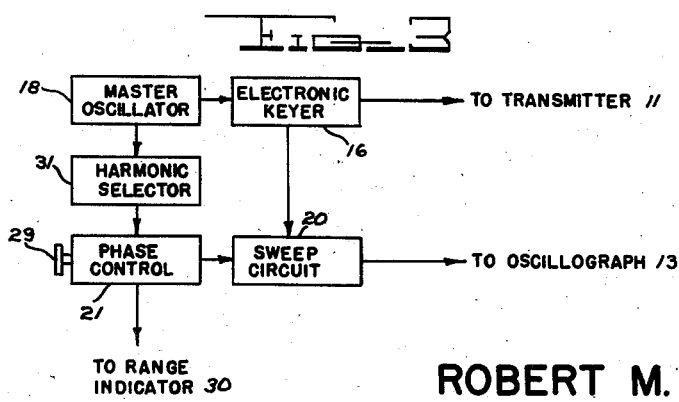
Inventor
ROBERT M. PAGE
By
Attorney Patented June 12, 1951

2,556,211

UNITED STATES PATENT OFFICE 2,556,211

PRECISION RANGE INDICATING SYSTEM

Robert M. Page, Washington, D. C.

Application March 11, 1943, Serial No. 478,830

3 Claims. (Cl. 343—13)

(Granted under the act of March 3, 1883, as amended April 30, 1928; 370 O. G. 757)

This invention relates to an indicating apparatus and more particularly to methods of and means for indicating range of remote objects detected by radio echo apparatus or similar devices with a high degree of accuracy.

Systems provided by the prior art for indicating range of remote objects detected by radio echo apparatus or similar ranging equipment are only capable of producing approximate range indications and are therefore inadequate for utilization in instances wherein extremely high degrees of accuracy are required, for example, in connection with gun fire control apparatus.

More particularly, such prior indicating systems include a cathode ray oscillograph, or similar indicating device, in connection with a sweep circuit for producing a linear time sweep line of the electron beam of the oscillograph which is operated in synchronism with and having a time length substantially equal to the time interval between the equally spaced energy pulses transmitted by the ranging apparatus. Thus, whenever the transmitted energy pulses impinge upon a remote object, energy pulses are reflected from such object and received at the apparatus where they are instantaneously applied to the oscillograph to deflect or modulate the intensity of the electron beam and thereby provide a visual indication of the time required for an energy wave to travel from the apparatus to the object and back again. The time sweep axis of the electron beam is generally graduated in range units and thereby provides a means for obtaining a true indication of the object range. As mentioned above, however, range indications obtained in the foregoing manner are not of a high degree of accuracy, since the ratio of actual object range to a corresponding length in time sweep is extremely high and therefore inherently results in a low degree of reading accuracy. Consequently, these range indications are inadequate for fire control purposes or other such similar purposes demanding precision range indications.

It is therefore an object of the present invention to provide a novel method of indicating range of remote objects detected by range apparatus or similar systems.

Another object is to provide novel means for indicating range of remote objects with a high degree of accuracy and reliability.

Another object is to provide a novel indicating system for ranging apparatus which includes a cathode ray oscillograph, or similar indicating device, with means for producing a sweep of the electron beam of the oscillograph at a frequency a number of times higher than the repetition rate of the energy pulses transmitted by the ranging apparatus.

Another object is to provide a novel indicating system for ranging apparatus which includes a cathode ray oscillograph or similar indicating device, with a means for producing a sweep of the electron beam of the oscillograph at a frequency a number of times higher than the repetition rate of the energy pulses transmitted by the ranging apparatus, and also with a means for varying the relative time phase between the initiation of the time sweep of the electron beam and the transmission of an energy pulse.

Other objects and features of the invention will appear more fully hereinafter from the following detailed description when considered in connection with the accompanying drawings which illustrate several embodiments of the invention. It is to be expressly understood, however, that the drawings are designed for purposes of illustration only and not as a definition of the limits of the invention, reference for the latter purpose being had to the appended claims.

In the drawings, wherein similar reference characters denote similar elements throughout the several views:

Fig. 1 is a block diagram of a radio echo apparatus embodying the principles of the invention;

Fig. 2 is an illustration of the indication produced by the apparatus disclosed in Fig. 1, and Fig. 3 is a block diagram of another embodiment of the invention.

With reference more particularly to Fig. 1 of the drawing, a radio echo apparatus constructed in accordance with the principles of the present invention is disclosed therein including a directional beam antenna 10, a pulse transmitter 11, a pulse receiver 12 and a cathode ray oscillograph 13. The antenna 10 is of any suitable construction capable of producing a highly directive energy beam. The transmitter 11 and the receiver 12 are designed in such a manner to properly transmit and receive energy pulses of extremely short duration such as transmitters and receivers employed in conventional television equipment. The oscillograph 13 is of the conventional type including means, not shown, for generating a beam of electrons, an intensity control grid 14, a pair of vertical deflecting plates $V_1$—$V_2$ and a pair of horizontal deflecting plates $H_1$—$H_2$. The output of transmitter 11 is fed through a channel of duplexing circuit 15 to the antenna 10, while the antenna is connected through another channel of the duplexing circuit 15 to the receiver 12 in order to employ a single antenna for transmission and reception. Operation of the transmitter 11 is controlled by electronic keyer 16 in such a manner that the transmitter produces a series of equally spaced energy pulses which are applied to the antenna 10 and emitted from the latter as a highly directive pulse emission. Energy received at the antenna 10 is passed through a channel of the duplexing circuit 15 to the receiver 12 wherein the energy is suitably amplified and subsequently fed to the vertical deflecting plate $V_2$ and intensity grid 14 by way of coupling condenser 17.

As mentioned heretofore, one of the features of the present invention is to provide a system for indicating range of remote objects detected by radio echo apparatus or similar systems with an extremely high degree of accuracy. In order to accomplish the foregoing, it is contemplated by the present invention to provide means for producing a time sweep of the electron beam of an oscillograph at a frequency a number of times greater than the repetition rate of the transmitted energy pulses. The foregoing means comprises a master oscillator 18, the output of which is fed into a frequency divider 19 and a phase controlling device 21. The frequency divider is of any suitable design to reduce the frequency of the master oscillator 18 a predetermined degree, for example, at a five to-one ratio. An electronic keyer 16 couples the output of the frequency divider 19 to the input of the pulse transmitter 11 and consequently controls the repetition rate of the energy pulse transmission from antenna 10, which in the particular case chosen is one-fifth the frequency of the master oscillator 18. The output of the master control oscillator 18 is also fed to sweep circuit 20 through phase control means 21. The purpose of the latter will appear more fully hereinafter. The output of the sweep circuit 20 is fed to the horizontal and vertical deflecting plates $H_1$, $H_2$, $V_1$ and $V_2$ of the oscillograph 13. The sweep circuit 20 may be of the conventional television design used to produce a plurality of parallel sweeps as shown in Fig. 2. Alternatively a spiral trace produced by a horizontal sine wave at master oscillator frequency combined with a vertical linear wave (saw-tooth) at pulse repetition frequency may be employed. In particular a sweep of the character illustrated in Fig. 2 may be obtained by producing a horizontal sweep of the electron beam of the oscillograph in response to each cycle of the output from the master oscillator 18 and also by producing and applying to the vertical deflecting plates a step-by-step increasing voltage. The step by step voltage applied to the vertical deflecting plate is synchronized with the horizontal movement of the electrom beam so as to provide approximately equal spacing between the horizontal traces. Such a sweep is clearly illustrated in U. S. Patent 2,276,460 issued to me on March 10, 1942. Since the total length of traces 23, 24 25, 26 and 27 represents the entire range of the apparatus, whereas in conventional indicating systems a singe trace equal in length to one of the aforementioned traces represented the entire range, a greatly increased reading accuracy proportional to the degree of sweep expansion is now obtainable. The foregoing may be more readily comprehended by assuming a transmitted energy pulse repetition rate of 1640 cycles per second which provides a maximum range of approximately 100,000 yards. If the frequency divider 19 is adjusted at a five-to-one ratio as heretofore assumed, the master oscillator 18 is necessarily tuned to a frequency of 8200 cycles per second, and therefore five complete sweeps of the electron beam of the oscillograph 13 are generated during the time interval between transmitted energy pulses, thus producing five linear traces on the screen 22 as shown in Fig. 2. Each of the linear traces 23, 24, 25, 26 and 27 therefore corresponds to 20,000 yards range, while in conventional range indicating systems a single trace having a length equal to the individual length of one of the traces 23, 24, 25, 26 or 27 would represent the entire range of the apparatus, i. e. 100,000 yards.

Whenever a transmitted energy pulse or energy pulses reflected from remote objects or both are received at the antenna 10 and applied through the receiver 12 to the vertical deflecting electrode $V_2$, the electron beam of the oscillograph 13 is deflected in accordance with the applied energy to produce indications on the linear traces 23, 24, 25, 26 and 27 at the instant such energy is applied to the vertical deflecting plate $V_2$. As shown in Fig. 2, transmitted energy pulse indication $t$ is produced at the left hand end of trace 23, whereas reflected energy pulses $a$, $b$ and $c$ are shown produced on linear traces 23, 25 and 27 respectively, time displaced with respect to the indication of the transmitted energy pulse. Since linear movement of the electron beam of the oscillograph 13 is synchronized with the repetition rate of transmitted energy pulses from the antenna 10, reflected energy pulse indications $a$, $b$ and $c$ determine direct measurements of range of the remote object from which the energy pulses are reflected. For example, the range of the remote object producing the reflected energy pulse indication $a$ is directly proportional to the time interval separating such indication from the transmitted pulse indication $t$. Likewise, the range of the objects producing indications $b$ and $c$ is proportional to the time interval between such indications and the transmitted pulse indication $t$.

As previously stated, another object of the present invention is to provide novel indicating means in connection with the indicating system described heretofore whereby range indications of remote objects represented by reflected energy pulse indications $a$, $b$ and $c$, or any other reflected energy pulse indication produced on linear traces 23, 24, 25, 26 and 27 are rapidly obtained with still higher degrees of accuracy. With reference again to Fig. 1 of the drawings the foregoing means comprises the phase control means 21 and a fixed reference line 28 shown on the screen 22 in Fig. 2. The phase control means 21 is of any suitable design well known in the art for varying the phase of the output signal from the master oscillator 18 upon rotation of manually operated dial 29. For example a goniometer or any suitable electronic phase varying device may be employed. The reference line 28 may be engraved on the face of the viewing screen 22 at right angles to linear traces 23, 24, 25, 26 and 27 and at some fixed position with respect to the lengths thereof, preferably at the intermediate points thereof as shown. The reference line 28 may also be produced by electronic means, synchronized with generation of the sweeps of the electron beam, by deflection of the electron beam for example. The latter method provides a system from which more accurate range indications are obtained since calibration of the position of linear traces 23, 24, 25, 26 and 27 on the screen 22 would not be necessary.

When it is desired to obtain the exact range of any of the remote objects represented by reflected energy pulse indications, the phase control means 21 is operated upon manual rotation of dial 29 to decrease the phase angle of the output signal from the master oscillator 18, thereby initiating generation of the sweeps of the electron beam a finite time prior to the transmission of an energy pulse. From a general understanding of phase shifting means it becomes obvious that the electron beam sweep can be displaced as much as 360° or equivalent to 20,000 yards, in this case, from the transmission of an energy pulse. Thus when the linear traces 23, 24, 25, 26 and 27 are initiated prior to the transmission of the energy pulse, the reflected energy pulse indications as well as the transmitted pulse indication $t$ are moved back in time or ahead on the time sweep with respect to the normal position shown in Fig. 2. The phase of the output signal from the master oscillator 18 is varied in the foregoing manner until the transmitted energy pulse indication $t$ coincides with the reference line 28. This provides a setting on dial 29 and indicator 30 for zero range.

Now to determine, as an example, the exact range of the object producing the reflection $a$, the dial 29 of the phase control means is rotated in the proper direction until the indication $a$ coincides with reference line 28 at which point the range is read directly from the dial 29 or indicator 30 since the original indication of $a$ was on the first trace and consequently was reflected from an object less than 20,000 yards range. Thus the exact range of the objects producing indications $b$ and $c$ can be found by following the same procedure. It is to be understood, however, that the range of any object producing an indication such as indications $b$ and $c$ which is not on the first trace is determined both by the trace the indication is on and the setting of the phase shifter dial after the indication has been centered on the fiducial line 28. The range, however, can be read directly from the dial 29 or indicator 30 by positioning thereon a plurality of scales, each of which contain the proper upper and lower range limits depending upon the sweep trace to which they relate. The range indicator 30 is any suitable means either electrical or mechanical for indicating the range obtained from dial 29 at a remote location such as adjacent to the guns.

Another embodiment of the invention is shown in Fig. 3 of the drawings. This embodiment includes other novel means for operating the sweep circuit 20 at a frequency a number of times greater than the repetition rate of the energy pulses emitted from the antenna 10 in order to produce a number of complete sweeps of the electron beam of the oscillograph 13 during the time interval between transmitted energy pulses. Therefore, this embodiment also produces an expanded indication on the screen 22, as shown in Fig. 2, from which extremely accurate range indications are obtained in a manner fully described heretofore.

As shown, the output of the master oscillator 18 is fed directly to the electronic keyer 16 and the transmitter 11, therefore producing equally spaced energy pulses at a rate corresponding to the frequency of the output signal from the master oscillator 18. In order to provide the apparatus with a total range of 100,000 yards, as assumed heretofore relative to the apparatus disclosed in Fig. 1, the master oscillator 18 is tuned to produce an output signal at a frequency of 1640 cycles per second. The output signal from the master oscillator 18 is also passed to harmonic selector 31, the output of which is fed to the range indicator 30 and to the sweep circuit 20, by way of the phase control 21. The harmonic selector 31 is of any suitable conventional type and is designed to select and produce an output signal at a frequency corresponding to a certain harmonic of the output signal from the master oscillator 18. For example, to produce five complete traces as shown in Fig. 2 the harmonic selector 31 is designed to produce an output signal of a frequency equal to the fifth harmonic of the output signal from the master oscillator 18. When the master oscillator 18 is tuned to a frequency of 1640 cycles per second, as previously assumed, the output signal from the harmonic selector 31 is of a frequency of 8200 cycles per second and the sweep circuit 20 therefore functions to produce the indication shown in Fig. 2.

Further operation of the arrangement shown in Fig. 3 is similar to previously described operation of the apparatus disclosed in Fig. 1 and further discussion thereof is believed unnecessary.

In addition to the greatly increased reading accuracy due to the expansion of the time sweep and phase control means, this invention also reduces to a minimum the effect of non-linearity inherent in phase shifting means by operating such means at a frequency much higher than the repetition rate of the energy pulse transmission. For example, a two per cent error in the phase shifting means 21 would result in a four-tenths per cent error in the final range measurement in this particular case where the sweep frequency is five times greater than the energy transmission recurrence rate.

Although I have shown and described only certain and specific embodiments of the present invention, I am fully aware of the many modifications possible thereof. Therefore this invention is not to be restricted except insofar as is necessitated by the prior art and the spirit of the appended claims.

The invention described herein may be manufactured and used by or for the Government of the United States of America for governmental purposes without the payment of any royalties thereon or therefor.

I claim:

1. In an apparatus for indicating range of remote objects the combination; comprising means for periodically emitting energy impulses, means for receiving said impulses after reflection from remote objects, a cathode ray oscilloscope including a fiducial line formed on the screen thereof, means producing a timing wave having a frequency equal to an integral multiple of the recurrence rate of said energy impulses, means including a phase shifting device coupling said timing wave to said oscilloscope to produce a multiline sweep of the electron beam of said oscilloscope in accordance with said timing wave, said sweep being isochronously related to the time interval between successive energy transmissions, means responsive to the reception of said energy reflections to produce indications on said sweep of the range of the objects from which the energy is reflected, and an adjustable phase control element incorporated in said phase shifting device operative to vary the start of said multi-line sweep relative to the transmission of an energy impulse to shift any selectable one of said indications into coincidence with said fiducial line and to indicate the range of the object producing such indication as a function of the phase variation required to shift said one indication into coincidence with said fiducial line.

2. In an apparatus for indicating range of remote objects the combination; comprising means producing a timing wave, means dividing the frequency of said timing wave, means for periodically emitting energy impulses in accordance with the divided frequency of the timing wave, means for receiving said impulses after reflection from remote objects, a cathode ray oscilloscope including a fiducial line formed on the screen thereof, means including a phase shifting device coupling said timing wave to said oscilloscope to produce a multi-line sweep of the electron beam of said oscilloscope in accordance with said timing wave, said sweep being isochronously related to the time interval between successive energy transmissions, means responsive to the reception of said energy reflections to produce indications on said sweep of the range of the objects from which the energy is reflected, and an adjustable phase control element incorporated in said phase shifting device operative to vary the start of said multi-line sweep relative to the transmission of an energy impulse to shift any selectable one of said indications into coincidence with said fiducial line and to indicate the range of the object producing such indication as a function of the phase variation required to shift said one indication into coincidence with said fiducial line.

3. In an appartus for indicating range of remote objects the combination; comprising means generating a timing wave, means producing a harmonically related frequency from said timing wave, means for periodically emitting energy impulses at a recurrence rate corresponding to the frequency of said timing wave, means for receiving said impulses after reflection from remote objects, a cathode ray oscilloscope including a fiducial line formed on the screen thereof, means including a phase shifting device coupling the harmonically related component of said timing wave to said oscilloscope to produce a multi-line sweep of the electron beam of said oscilloscope in accordance with the harmonic of said timing wave, said sweep being isochronously related to the time interval between successive energy transmissions, means responsive to the reception of said energy reflections to produce indications on said sweep of the range of the objects from which the energy is reflected, and an adjustable phase control element incorporated in said phase shifting device operative to vary the start of said multi-line sweep relative to the transmission of an energy impulse to shift any selectable one of said indications into coincidence with said fiducial line and to indicate the range of the object producing such indication as a function of the phase variation required to shift said one indication into coincidence with said fiducial line.

ROBERT M. PAGE.

REFERENCES CITED

The following references are of record in the file of this patent:

UNITED STATES PATENTS

| Number | Name | Date |
|---|---|---|
| 2,143,035 | Smith | Jan. 10, 1939 |
| 2,227,598 | Lyman et al. | Jan. 7, 1941 |
| 2,275,460 | Page | Mar. 10, 1942 |
| 2,405,238 | Seeley | Aug. 6, 1946 |
| 2,408,415 | Donaldson | Oct. 1, 1946 |
| 2,426,216 | Hight | Aug. 26, 1947 |
| 2,426,989 | De Rosa | Sept. 9, 1947 |
| 2,433,838 | Elie | Jan. 6, 1948 |
| 2,454,782 | De Rosa | Nov. 30, 1948 |
| 2,471,408 | Busignies | May 31, 1949 |
| 2,534,862 | Fox | Dec. 19, 1950 |

FOREIGN PATENTS

| Number | Country | Date |
|---|---|---|
| 406,903 | Great Britain | Mar. 8, 1934 |
| 784,425 | France | Apr. 29, 1935 |

OTHER REFERENCES

Exhibit "C" U. S. Signal Corps "110 mc. Plane Detection and Position Finding System Signal Corps. Demonstration," May 1937.